(12) United States Patent
Mandagere et al.

(10) Patent No.: US 10,127,266 B2
(45) Date of Patent: Nov. 13, 2018

(54) SCALABLE VIRTUAL NAMESPACE AND SEMANTIC POLICY MANAGEMENT FOR OBJECT STORAGE

(71) Applicant: International Business Machines Corporation, Armonk, NY (US)

(72) Inventors: Nagapramod S. Mandagere, San Jose, CA (US); Mohit Saxena, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 252 days.

(21) Appl. No.: 14/931,731

(22) Filed: Nov. 3, 2015

(65) Prior Publication Data
US 2017/0124138 A1    May 4, 2017

(51) Int. Cl.
*G06F 17/30* (2006.01)
*G06N 7/00* (2006.01)

(52) U.S. Cl.
CPC .. *G06F 17/30371* (2013.01); *G06F 17/30342* (2013.01); *G06F 17/30867* (2013.01); *G06N 7/005* (2013.01)

(58) Field of Classification Search
CPC .......... G06F 17/30309; G06F 12/0846; G06F 17/303033
See application file for complete search history.

(56) References Cited

U.S. PATENT DOCUMENTS

| 8,650,165 | B2 | 2/2014 | Thakur et al. | |
|---|---|---|---|---|
| 8,954,406 | B2 | 2/2015 | Rodriguez et al. | |
| 2007/0156842 | A1* | 7/2007 | Vermeulen | G06F 17/30212 709/217 |
| 2010/0145917 | A1* | 6/2010 | Bone | G06F 17/30221 707/694 |
| 2013/0268644 | A1* | 10/2013 | Hardin | H04L 61/1582 709/223 |
| 2015/0200852 | A1* | 7/2015 | Solis | H04L 45/7453 370/328 |

(Continued)

OTHER PUBLICATIONS

Ratner, M., "Better Object Storage with Hitachi Content Platform," The Fundamentals of Hitachi Content Platform, Nov. 2014, pp. 1-28.

(Continued)

*Primary Examiner* — Mariela Reyes
*Assistant Examiner* — Courtney Harmon
(74) *Attorney, Agent, or Firm* — Zilka-Kotab, P.C.

(57) ABSTRACT

In one embodiment, a computer-implemented method for object-granular policy assignment in an object storage environment includes: automatically assigning a plurality of objects stored within the object storage environment to one or more policies; and locating one or more of the objects among a plurality of policy rings within the object storage environment based on semantics of the one or more policies. A virtual namespace maps each object to at least one of the policy rings based on the one or more policies assigned to the object; and the virtual namespace is scalable with a number of the plurality of objects stored within the object storage environment. Corresponding systems and computer program products are also disclosed.

19 Claims, 6 Drawing Sheets

(56) References Cited

U.S. PATENT DOCUMENTS

2016/0321185 A1* 11/2016 Doshi ................ G06F 12/0864

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Dec. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
Mandagere et al., U.S. Appl. No. 16/020,886, filed Jun. 27, 2018.

* cited by examiner

SCALABLE VIRTUAL NAMESPACE AND SEMANTIC POLICY MANAGEMENT FOR OBJECT STORAGE

BACKGROUND

The present invention relates to object storage, and more particularly, this invention relates to providing virtual namespaces and semantic policies for object-granular policy management in cloud storage systems and networks.

Cloud storage is not conducive to the typical file system-based storage policies and conventions such as hierarchical storage, block storage, etc. adopted for data storage in standalone workstations, storage area networks, etc. Accordingly, object storage has been implemented as the preferred storage architecture for cloud storage.

One conventional approach to object storage is to utilize different "containers" to store objects according to one or more storage policies. All objects in a particular container are subject to the same storage policy. Accordingly, the containers define the level of granularity of the object storage system and in order for an object to be subject to a different storage policy, it must be moved from the current container to a different container employing the different storage policy.

Undesirably, this requirement adds overhead to the object storage system, because each time an object requires a policy change, it must be moved physically on the underlying infrastructure and logically among the containers.

Some conventional object storage systems may therefore implement a manifest file to provide pointers to the various objects as they migrate around the object storage system. For example, the manifest file is typically created upon an object being moved to a new container, and is placed in the location from which the object was moved, with a pointer indicating the location to which the object was moved.

Undesirably, the manifest-file (and other similar pointer-based approaches) introduce additional lookup requirements, as a query to locate an object must pass through at least two, and as many as every container in which the object has been stored.

Accordingly, it would be beneficial to provide systems and techniques for allowing more facile policy changes to be applied to individual objects, without generating the significant additional lookup performance loss associated with static, pointer-based approaches.

SUMMARY

In one embodiment, a computer-implemented method for object-granular policy assignment in an object storage environment includes: automatically assigning a plurality of objects stored within the object storage environment to one or more policies; and locating one or more of the objects among a plurality of policy rings within the object storage environment based on semantics of the one or more policies. A virtual namespace maps each object to at least one of the policy rings based on the one or more policies assigned to the object; and the virtual namespace is scalable with a number of the plurality of objects stored within the object storage environment.

In another embodiment, a computer program product for object-granular policy assignment in an object storage environment includes a computer readable storage medium having program instructions embodied therewith. The computer readable storage medium is not a transitory signal per se, and the program instructions are executable by an object storage system to cause the object storage system to perform a method. The method includes automatically assigning a plurality of objects stored within the object storage environment to one or more policies; and locating one or more of the objects among a plurality of policy rings within the object storage environment based on semantics of the one or more policies. A virtual namespace maps each object to at least one of the policy rings based on the one or more policies assigned to the object; and the virtual namespace is scalable with a number of the plurality of objects stored within the object storage environment.

In yet another embodiment, a system for object-granular policy assignment in an object storage environment includes: a processor and logic integrated with and/or executable by the processor. The logic is configured to: automatically assign a plurality of objects stored within the object storage environment to one or more policies utilizing a semantic policy manager; and locate one or more of the objects among a plurality of policy rings within the object storage environment based on semantics of the one or more policies. A virtual namespace maps each object to at least one of the policy rings based on the one or more policies assigned to the object; and the virtual namespace is scalable with a number of the plurality of objects stored within the object storage environment.

Other aspects and embodiments of the present invention will become apparent from the following detailed description, which, when taken in conjunction with the drawings, illustrate by way of example the principles of the invention.

DETAILED DESCRIPTION

Figure 1:
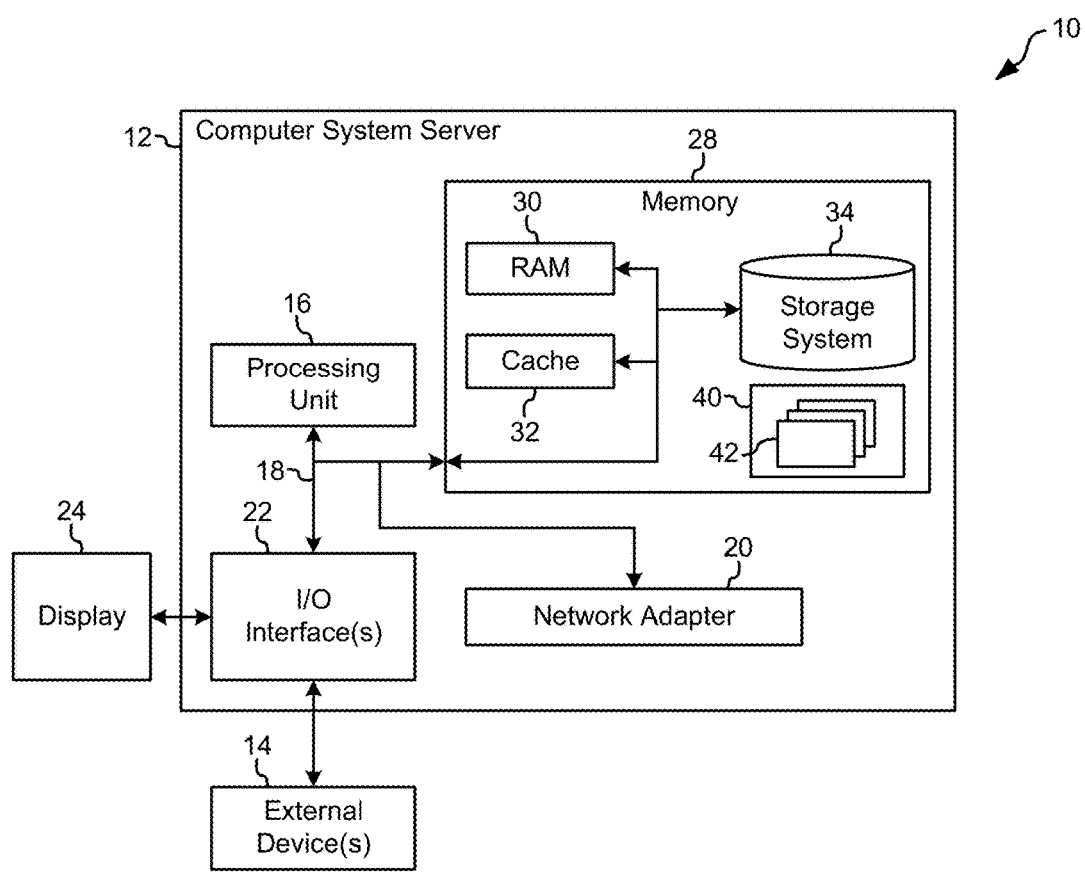
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the"

include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of object-granular storage policy assignment via a scalable namespace and probabilistic data structures.

In one general embodiment, a computer-implemented method for object-granular policy assignment in an object storage environment includes: automatically assigning a plurality of objects stored within the object storage environment to one or more policies; and locating one or more of the objects among a plurality of policy rings within the object storage environment based on semantics of the one or more policies. A virtual namespace maps each object to at least one of the policy rings based on the one or more policies assigned to the object; and the virtual namespace is scalable with a number of the plurality of objects stored within the object storage environment.

In another general embodiment, a computer program product for object-granular policy assignment in an object storage environment includes a computer readable storage medium having program instructions embodied therewith. The computer readable storage medium is not a transitory signal per se, and the program instructions are executable by an object storage system to cause the object storage system to perform a method. The method includes automatically assigning a plurality of objects stored within the object storage environment to one or more policies; and locating one or more of the objects among a plurality of policy rings within the object storage environment based on semantics of the one or more policies. A virtual namespace maps each object to at least one of the policy rings based on the one or more policies assigned to the object; and the virtual namespace is scalable with a number of the plurality of objects stored within the object storage environment.

In yet another general embodiment, a system for object-granular policy assignment in an object storage environment includes: a processor and logic integrated with and/or executable by the processor. The logic is configured to: automatically assign a plurality of objects stored within the object storage environment to one or more policies utilizing a semantic policy manager; and locate one or more of the objects among a plurality of policy rings within the object storage environment based on semantics of the one or more policies. A virtual namespace maps each object to at least one of the policy rings based on the one or more policies assigned to the object; and the virtual namespace is scalable with a number of the plurality of objects stored within the object storage environment.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
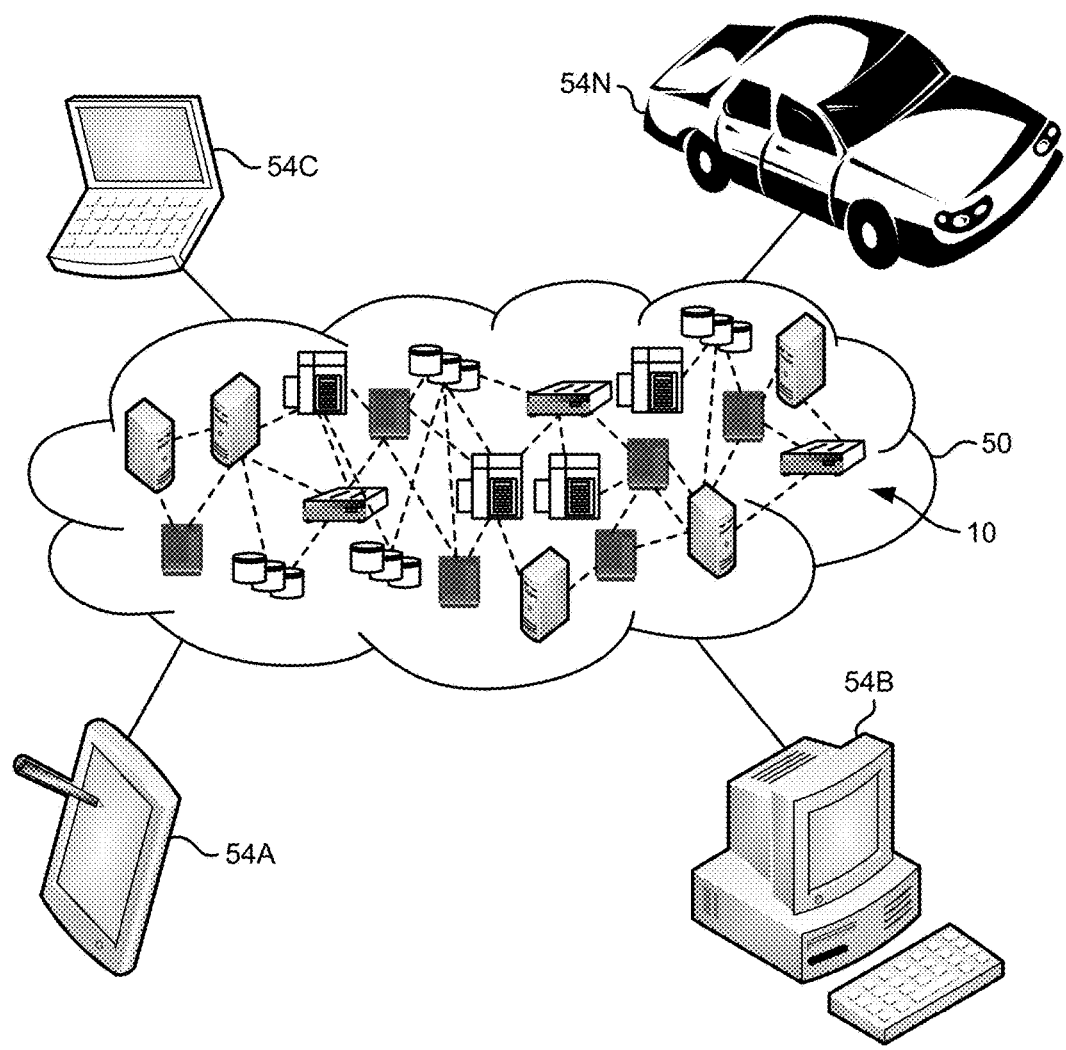
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
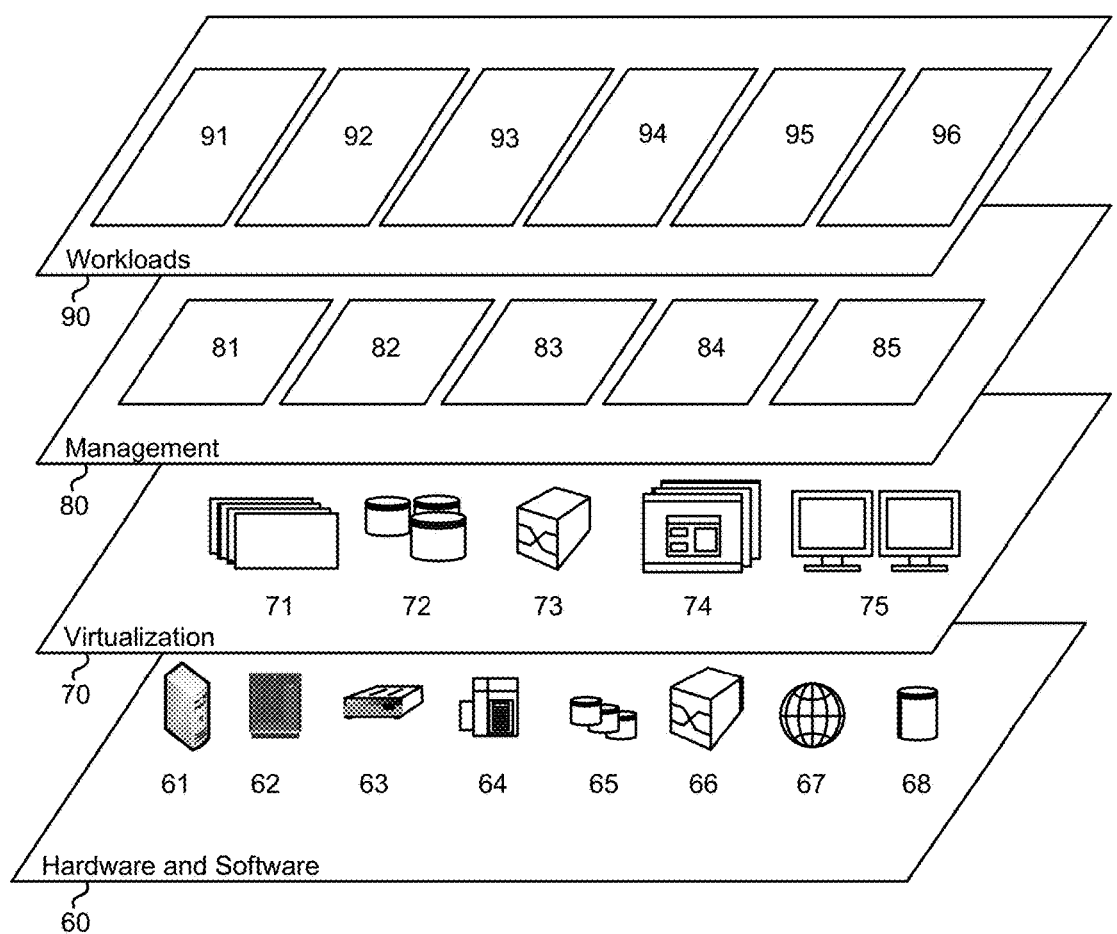
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The presently disclosed inventive concepts may be implemented in any suitable layer as described above and would be understood by a skilled artisan upon reading the present descriptions. In preferred approaches, the presently disclosed inventive concepts are implemented at least in part at the virtualization layer 62 and/or hardware and software layer 60, particularly using the storage components, modules, etc. thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

Figure 4:
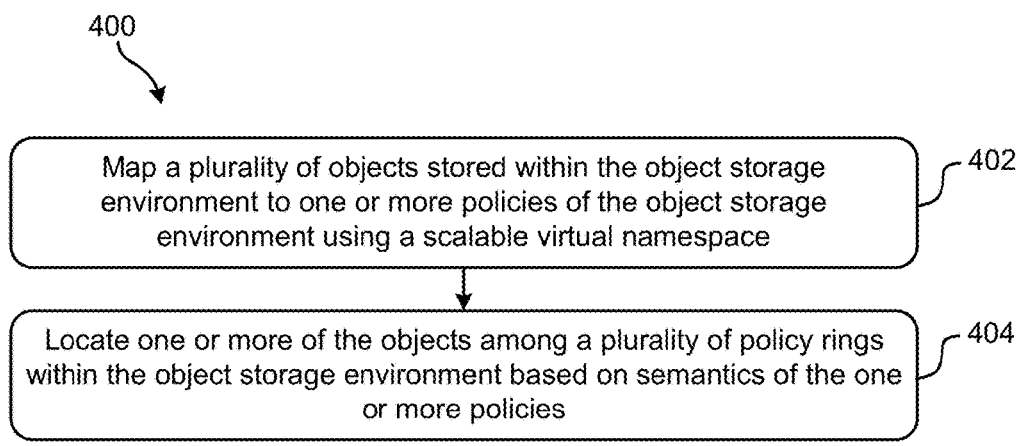
FIG. 4 is a flowchart of a method, according to one embodiment.

Now referring to FIG. 4, a flowchart of a method 400 for object-granular policy assignment in an object storage environment is shown, according to one embodiment. The method 400 may be performed in accordance with the present invention in any of the environments depicted in FIGS. 1-3 and 5-6B, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by components of a mobile device, a backend server, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a plurality of objects stored in an object storage environment are automatically assigned one or more of a plurality of policies of the object storage environment. A virtual namespace is employed, and maps each object to at least one of the policy rings based on the one or more policies assigned to the object. The virtual namespace is scalable with a number of the plurality of objects stored within the object storage environment.

As shown in FIG. 4, method 400 may continue with operation 404, where one or more of the objects are located within a plurality of policy rings of the object storage environment. The locating is based on semantics of the one or more policies.

Of course, the method 400 may include any number of additional features and/or functionalities described herein, as well as any equivalents thereof that would be appreciated by a person having ordinary skill in the art upon reading the present descriptions. In various preferred approaches, the method 400 may include, employ, leverage, etc. any number of the following features and/or functions.

In one approach, for example, the locating uses one or more probabilistic data structures. Accordingly, the one or more probabilistic data structures may locate the objects using one or more hash functions.

Figure 6A:
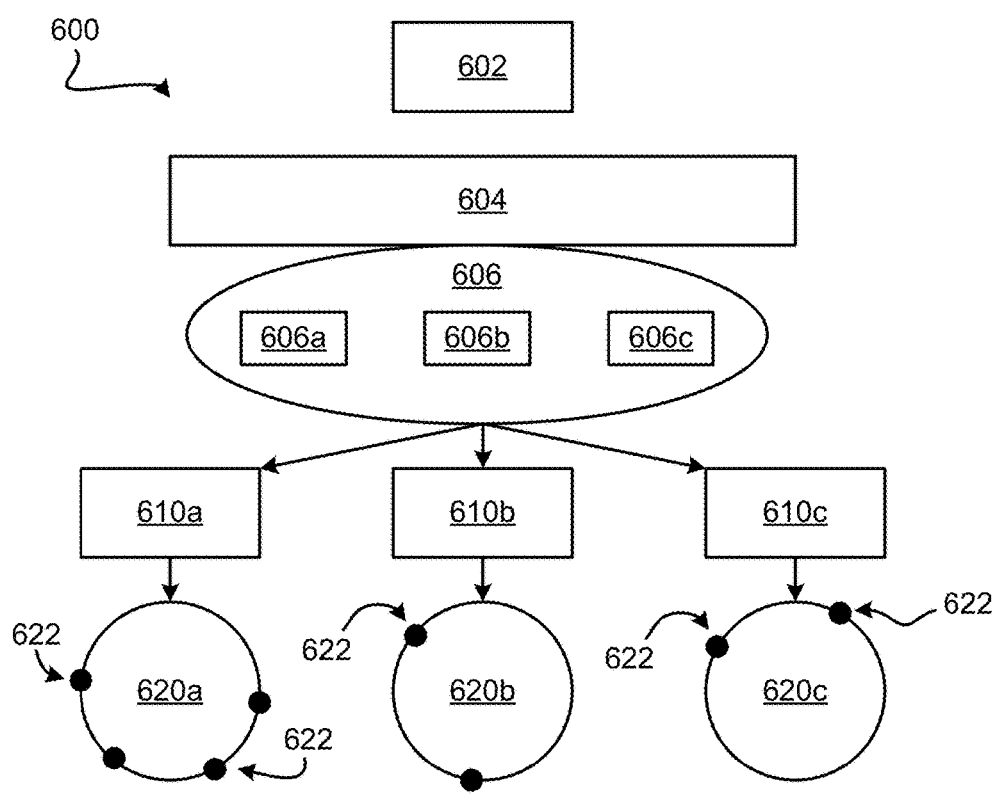
FIG. 6A depicts a simplified schematic of a cloud object storage architecture with a virtual namespace for object-granular policy management, according to one embodiment.

According to one embodiment of an exemplary object storage environment 600 as shown in FIG. 6A, the probabilistic data structures 606a-606c (including 606b) are preferably implemented via a virtual namespace 606 that is scalable with the number of objects 622 stored in/associated with one or more policy rings 620a-620c. The virtual namespace 606 is communicatively coupled to each policy ring 620a-620c via a plurality of logical rings 610a-610c (including 610b), each logical ring being communicatively coupled to one of the policy rings 620a-620c. To receive and process incoming requests, e.g. for object access, the virtual namespace 606 is also communicatively coupled to one or more client devices 602 via a proxy server 604.

As mentioned above, the probabilistic data structures 606a-606c are preferably implemented via this virtual namespace 606, and may provide the advantageous capability to scale the virtual namespace with the number of objects stored by the object storage environment. Of particular advantage is the ability of these probabilistic data structures 606a-606c to reduce the amount of data that must be stored (and subsequently searched, hashed, etc.) in order to facilitate accurate and efficient lookup without requiring a full lookup table.

Thus, in preferred embodiments the object storage environment 600 includes at least (n—1) probabilistic data structures 606a-606c, where n is the number of policy rings (e.g. 620a-620c) of the object storage environment 600. The object storage environment may particularly tolerate less than n probabilistic data structures in embodiments where the probabilistic data structures are employed in a particular order during lookup.

In addition, when the probabilistic data structures are prioritized according to policy semantics, the prioritization may also maximize the efficiency of the lookup process. For instance, since latency associated with performing lookups on a relatively high-performance storage device will be less than that associated with similar lookups on a relatively low-performance storage device, by prioritizing the probabilistic data structures according to device performance (e.g. based on storage policy performance characteristics as discussed herein). Similar advantages with respect to availability may be achieved by prioritizing application of probabilistic data structures according to availability characteristics of a semantic policy, as would be understood by a person having ordinary skill in the art upon reading the present descriptions. Prioritization of probabilistic data structures according to various embodiments will be discussed in further detail, below.

Accordingly, the one or more probabilistic data structures 606a-606c are preferably characterized by a 100% recall rate. In other words, the probabilistic data structures 606a-606c are capable of returning false positive results during a lookup operation, e.g. improperly indicating that an object 622 not actually belonging to a particular policy ring 620a-620c belongs to the particular policy ring 620a-620c. However, the probabilistic data structures 606a-606c will never return a false negative result, e.g. improperly indicating an object 622 actually belonging to a particular policy ring 620a-620c is not a part of the particular policy ring 620a-620c.

This lack of false negative results further facilitates the use of the probabilistic data structures 606a-606c as a mechanism to provide scalability to the virtual namespace without requiring commensurate increase in size of the data structure used to locate objects stored in the object storage environment, as well as avoiding commensurate increases in lookup operation time and resource consumption. In this manner, the presently disclosed inventive techniques improve the functioning of object based storage systems by allowing object-level granularity of policy assignment with reduced latency and input/output bandwidth.

Figure 5:
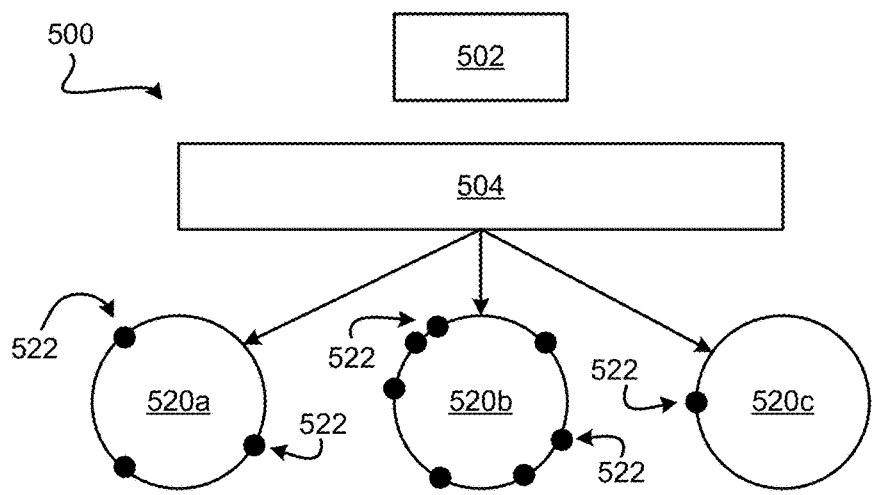
FIG. 5 depicts a simplified schematic of a conventional cloud object storage architecture in which storage policies are associated with individual storage containers.

For instance, and by way of comparison to a conventional solution to object storage, e.g. object storage environment 500 as shown in FIG. 5, objects 522 are stored in containers such as containers 520a, 520b, and/or 520c. Each container is associated with a particular storage policy, and thus the object storage environment is characterized by a policy granularity at the container level rather than the object level. Each container is communicatively coupled to one or more client devices 502 via a proxy server 504.

According to this conventional configuration of object storage environment 500, in order to change an object 522 assigned storage policy, it is necessary to move the object from one storage container to another, e.g. from container 520a to container 520c. This may or may not also require moving the data corresponding to the object 522 to another physical storage device, undesirably adding additional overhead to the object storage environment.

One attempt to introduce flexibility to the coupling between object storage policy and the storage container in which the object is located is to provide a static lookup data structure. In particular, when an object needs to be moved from one container to another, a pointer, stub file, manifest file, or other equivalent reference to the object is created in the original location, and points to the new object location. Thus, upon searching for the object in the old location, even applications (and indeed the storage environment itself) can be redirected to the new location. However, this approach disadvantageously doubles the number of lookup operations.

Accordingly, the presently disclosed inventive concepts both provide object-level granularity and represent a reduction in the number of lookups (and therefore latency and bandwidth consumption) potentially needed to locate a particular object by a factor of two relative to conventional approaches, in various embodiments. Similarly, the presently disclosed inventive concepts represent a reduction in other types of redundant lookup operations that would otherwise be required using conventional configurations, as would be understood by a person having ordinary skill in the art upon reading the present descriptions.

Accordingly, the presently disclosed inventive concepts improve the functioning of object based storage environments in a significant manner. In preferred implementations, the presently disclosed inventive concepts convey object-level granularity of storage policy assignment without requiring, on average, more than one lookup operation to locate an object on physical storage.

Returning to the probabilistic data structures of the presently disclosed inventive concepts, in particularly preferred approaches the one or more probabilistic data structures comprise one or more Bloom filters. Bloom filters advantageously satisfy the criterion of 100% recall, and represent a highly efficient data structure for performing lookup in the context of object-based storage environments as disclosed herein. A particular advantage arises from the ability to tune a particular Bloom filter's false positive recall rate based on manipulating either a number of hash functions employed by the Bloom filter, a size of the bloom filter in memory, or both. Since Bloom filter false positive rate is a function of these two variables, it is possible to optimize false positive rates for various Bloom filters based on the policies implemented in the object storage environment.

For instance, in various approaches storage policies may be defined with respect to physical storage device characteristics (e.g. performance characteristics such as access time, capacity, etc.); storage architecture characteristics (e.g. presence of multiple storage tiers, each of which may include different types of physical and/or virtual storage devices); requirements of various applications relying on data stored via the object storage environment; data retention and/or duplication practices of an entity utilizing or managing the object storage environment; etc. as would be understood by a person having ordinary skill in the art upon reading the present descriptions.

In various approaches, the semantics of a particular storage policy, or a set of storage policies, may be based on one or more of these characteristics. In preferred approaches, the semantics comprise at least two of the foregoing characteristics, and in particularly preferred approaches comprise performance characteristics and/or availability characteristics.

Performance characteristics may be understood to include any suitable measure of storage system performance, particularly characteristics of physical storage devices serving the object storage environment. In especially preferred approaches, performance characteristics include at least one of a capacity of physical storage device(s); bandwidth of a particular storage device serving the object storage environment, a type of storage medium of physical storage device(s) (e.g. tape, hard disk drive, solid state drive, etc.) serving the object storage environment; and a latency or an access time for physical storage device(s) serving the object storage environment.

Availability characteristics may be understood to include any suitable measure of data availability within a storage system. For instance, in one approach availability characteristics may include a number of replicas of a particular object available for simultaneous use by one or more applications served by the object storage environment. In another embodiment, availability characteristics may include a number of physical devices upon which a particular object is stored, giving an indication of redundancy and therefore reliability of the object being available at any given time.

Of course, similar or corresponding performance and/or availability characteristics for virtual storage devices may be employed without departing from the scope of the presently disclosed inventive concepts.

In preferred approaches, the storage policies are implemented and managed according to the intended use of the underlying object data within the object storage environment, and most preferably using a semantic policy manager.

Figure 6B:
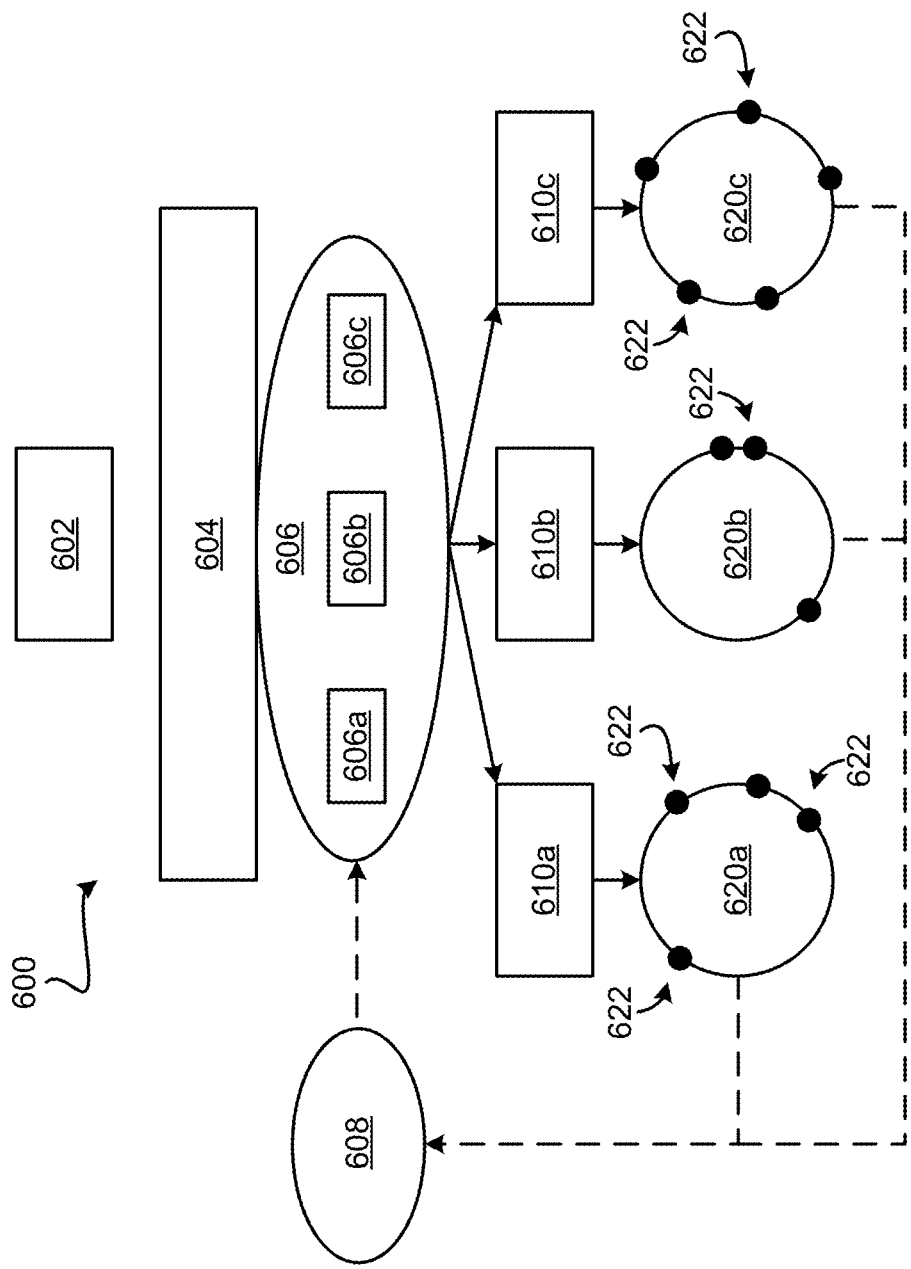
FIG. 6B depicts a simplified schematic of a scalable cloud object storage architecture with a virtual namespace for object-granular policy management and a semantic policy manager for lookup prioritization, according to one embodiment.

The semantic policy manager, e.g. semantic policy manager 608 as shown in FIG. 6B, may leverage semantics of storage policies of the object storage environment 600, e.g. the policies for policy rings 620a-620c, to improve functionality of the presently disclosed inventive embodiments. In particular, the semantic policy manager 608 may determine the semantic characteristics, e.g. performance characteristics and/or availability characteristics, of various physical and/or virtual storage devices of the object storage environment 600. Based on the determined characteristics, which may be substantially static for a particular storage cluster serving the object storage environment, the semantic policy manager 608 may determine an appropriate "strength" of various probabilistic structures.

As understood herein, a probabilistic data structure may be considered "strong" when it rigorously searches a particular source for a query such that false positive rate is relatively low, e.g. a false positive rate in a range from about $1 \times 10^{-8}$ to about $1 \times 10^{-10}$ for an object storage environment having approximately one billion objects, Conversely, a probabilistic data structure may be considered "weak" when the false positive rate is relatively high, e.g. a false positive rate in a range from about $1 \times 10^{-4}$ to about $1 \times 10^{-6}$ for an object storage environment having approximately one billion objects, in various embodiments.

As noted above, strength of probabilistic data structures with 100% recall rate is primarily a function of the memory size of the data structure and the number of hash operations included in the probabilistic data structure. Increasing memory size decreases the false positive rate for the corresponding probabilistic data structure, at the cost of lookup operation performance. Since the false positive rate is a function of the number of hash functions in the probabilistic data structure divided by the memory size of the probabilistic data structure, decreasing the number of hash functions included in the probabilistic data structure has a similar strengthening effect.

Conversely, decreasing the size of the probabilistic data structure and/or increasing the number of hash functions each independently increase the false positive rate of the probabilistic data structure, weakening the probabilistic data structure.

Accordingly, in various approaches the semantic policy manager 608 preferably defines a size of probabilistic data structures and/or number of hash functions for the probabilistic data structures based on the semantic characteristics of the storage policies implemented therein. More preferably, the definition is performed in such a manner as to produce a series of probabilistic data structures each having a different strength, and the strength is optimized to minimize overall latency, I/O bandwidth, etc. for lookup operations within the object storage environment 600.

In operation, and according to one embodiment consistent with the arrangement shown in FIG. 6B, the semantic policy manager acquires semantic characteristics regarding various storage devices for each policy ring 620a-620c, and based on the semantic characteristics, defines a priority of probabilistic data structures to apply in performing a lookup.

For example if the performance potential from one of the policies to another policy is significant e.g. in one embodiment a latency for SSD storage devices is on the scale of microsecond(s), for HDD storage devices is on the scale of millisecond(s) and for tape storage devices is on the scale of second(s). Alternatively, in another embodiment the performance potential across two tiers may be low or high. In such schemes it is advantageous to a stronger bloom filter for the higher performance devices/tiers than in the lower performance devices/tiers. In part, this is because the latency associated with rigorously searching the high performance device/tier is relatively low, in some embodiments negligible, with respect to performing an even less rigorous lookup on the lower performance device/tier.

For instance, if a tape lookup takes 10 seconds and a HDD lookup take 3 milliseconds the latency associated with performing a rigorous HDD lookup (3 milliseconds) pales in comparison to a lookup on tape (10 seconds) and therefore overall performance detriment of rigorously searching the HDD outweighs the performance detriment of needing to access the lower performance device/tier.

With respect to availability, similar principles regarding prioritizing application of probabilistic data structures so as to minimize latency and bandwidth are applicable, but are differently implemented. For instance, in one embodiment different storage policies may be characterized by different replication levels of data stored on the corresponding device (s). In a simple scenario, one policy ring 620*a* stores a single replica, another policy ring 620*b* stores two replicas, and a third policy ring 620*c* stores three replicas.

Importantly, since multiple devices may serve each policy ring 620*a*-620*c*, increasing replication level also potentially increases the bandwidth required to locate an object within the policy ring, since multiple lookups may be necessary. For instance, for third policy ring 620*c* in the above scenario, since the probabilistic data structures disclosed herein have 100% recall rates, three hits will be determined. If all three are false positives (an unlikely but possible scenario), then searching this ring first, and/or searching this ring with a weak bloom filter first, is likely to generate unnecessary I/O bandwidth in the form of three lookups. Conversely, if the same order of search is applied to first policy ring 620*a*, only a single potentially unnecessary operation will be performed.

In this scenario, it is preferable to use stronger probabilistic data structures to perform lookups within policy rings having higher levels of replication, or other availability measures.

Accordingly, in one embodiment method 400 may include using a semantic policy manager to define a size of each probabilistic data structure based on a policy for which the probabilistic data structure is used within the object storage environment.

In another embodiment method 400 may include using a semantic policy manager to: optimize a false positive rate for each of the probabilistic data structures, each of the probabilistic data structures being optimized to have a different false positive rate; and define a scan order for the one or more probabilistic data structures based on the different false positive rates.

In still yet another embodiment method 400 may include using a semantic policy manager to: determine one or more of availability characteristics and performance characteristics of a plurality of physical storage devices within the object storage environment upon which the plurality of objects are stored; determine at least one differential between the availability characteristics and/or the performance characteristics for the plurality of physical storage devices; and define a plurality of probabilistic data structures having different false positive rates based on the at least one differential, each probabilistic data structure corresponding to at least one of the policies.

In more embodiments method 400 may include using a semantic policy manager to: determine availability characteristics and performance characteristics of a plurality of physical storage devices within the object storage environment upon which the plurality of objects are stored; determine a plurality of differentials between the availability characteristics and the performance characteristics for each pair of the plurality of physical storage devices; define a plurality of Bloom filters having different false positive rates based on the plurality of differentials, each Bloom filter corresponding to at least one of the policies; define a size of each of the Bloom filters based on a policy for which the Bloom Filter is used within the object storage environment; optimize a false positive rate for each of the Bloom filters using the semantic policy manager, each of the Bloom filters being optimized to have a different false positive rate; and define a scan order for the plurality of Bloom filters based on the different false positive rates.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for object-granular policy assignment in an object storage environment, the method comprising:
    automatically assigning a plurality of objects stored within the object storage environment to one or more policies; and
    locating one or more of the objects among a plurality of policy rings within the object storage environment based on semantics of the one or more policies,
    wherein a virtual namespace maps each object to at least one of the policy rings based on the one or more policies assigned to the object;
    wherein the virtual namespace is scalable with a number of the plurality of objects stored within the object storage environment; and
    wherein the locating uses one or more probabilistic data structures; and
    wherein the probabilistic data structures provide object-level granularity with respect to assigning policies to the plurality of objects stored within the storage environment.

2. The computer implemented method of claim 1, wherein the one or more probabilistic data structures are characterized by a 100% recall rate.

3. The computer implemented method of claim 1, wherein the one or more probabilistic data structures comprise one or more Bloom filters.

4. The computer implemented method of claim 1, comprising: using a semantic policy manager to define a scan order for the one or more probabilistic data structures based on semantics of the one or more policies of the object storage environment, the semantics comprising one or more of availability characteristics and performance characteristics.

5. The computer implemented method of claim 1, comprising using a semantic policy manager to define a size of each probabilistic data structure based on semantic characteristics of a policy for which the probabilistic data structure is used within the object storage environment;
    wherein the one or more probabilistic data structures comprise a plurality of probabilistic data structures;
    wherein the size of each probabilistic data structure is defined so as to produce a series of probabilistic data structures each characterized by a different strength; and
    wherein the respective strengths of the plurality of probabilistic data structures are configured to minimize latency, I/O and bandwidth associated with performing lookup operations within the object storage environment.

6. The computer implemented method of claim 1, comprising using a semantic policy manager to:
  optimize a false positive rate for each of the probabilistic data structures, each of the probabilistic data structures being optimized to have a different false positive rate; and
  define a scan order for the one or more probabilistic data structures based on the different false positive rates.

7. The computer implemented method of claim 1, comprising using a semantic policy manager to:
  determine one or more of availability characteristics and performance characteristics of a plurality of physical storage devices within the object storage environment upon which the plurality of objects are stored;
  determine at least one differential between the availability characteristics and/or the performance characteristics for the plurality of physical storage devices; and
  define a plurality of probabilistic data structures having different false positive rates based on the at least one differential, each probabilistic data structure corresponding to at least one of the policies.

8. The computer implemented method of claim 1, comprising assigning a different of the one or more policies to one or more of the objects without modifying an externally client-visible namespace of the object.

9. The computer implemented method of claim 1, wherein the virtual namespace is communicatively coupled to each of the policy rings via a plurality of logical rings; and
  wherein each of the logical rings is communicatively coupled to one of the policy rings.

10. The computer implemented method of claim 1, wherein one or more probabilistic data structures comprise at least (n−1) probabilistic data structures; and
  wherein n is a number of the plurality of policy rings within the object storage environment.

11. The computer implemented method of claim 1, wherein locating the one or more of the objects among the plurality of policy rings within the object storage environment requires, on average, one lookup operation.

12. A computer program product for object-granular policy assignment in an object storage environment, the computer program product comprising a computer readable storage medium having program instructions embodied therewith, wherein the computer readable storage medium is not a transitory signal per se, the program instructions executable by an object storage system to cause the object storage system to perform a method comprising:
  automatically assigning a plurality of objects stored within the object storage environment to one or more policies; and
  locating one or more of the objects among a plurality of policy rings within the object storage environment based on semantics of the one or more policies;
  wherein a virtual namespace maps each object to at least one of the policy rings based on the one or more policies assigned to the object; and
  wherein the virtual namespace is scalable with a number of the plurality of objects stored within the object storage environment;
  wherein the locating uses one or more probabilistic data structures; and
  wherein the probabilistic data structures provide object-level granularity with respect to assigning policies to the plurality of objects stored within the storage environment.

13. The computer program product of claim 12, wherein the one or more probabilistic data structures comprise one or more Bloom filters characterized by a 100% recall rate.

14. The computer program product of claim 12, comprising program instructions executable by an object storage system to cause a semantic policy manager of the object storage system to define:
  a scan order for the one or more probabilistic data structures based on semantics of the one or more policies of the object storage environment, the semantics comprising one or more of availability characteristics and performance characteristics; and
  a size of each probabilistic data structure based on a policy for which the probabilistic data structure is used within the object storage environment.

15. The computer program product of claim 12, comprising program instructions executable by an object storage system to cause a semantic policy manager of the object storage system to:
  optimize a false positive rate for each of the probabilistic data structures using the semantic policy manager, each of the probabilistic data structures being optimized to have a different false positive rate; and
  define a scan order for the one or more probabilistic data structures based on the different false positive rates.

16. The computer program product of claim 12, comprising program instructions executable by the object storage environment to cause a semantic policy manager of the object storage environment to: assign a different of the one or more policies to one or more of the objects without modifying a physical storage location of the object.

17. The computer program product of claim 12, comprising program instructions executable by the object storage environment to cause a semantic policy manager of the object storage environment to:
  determine one or more of availability characteristics and performance characteristics of a plurality of physical storage devices within the object storage environment upon which the plurality of objects are stored;
  determine at least one differential between the availability characteristics and/or the performance characteristics for the plurality of physical storage devices; and
  define a plurality of probabilistic data structures having different false positive rates based on the at least one differential, each probabilistic data structure corresponding to at least one of the policies.

18. A system for object-granular policy assignment in an object storage environment, comprising:
  a processor and logic integrated with and/or executable by the processor, the logic being configured to:
    automatically assign a plurality of objects stored within the object storage environment to one or more policies utilizing a semantic policy manager;
    locate one or more of the objects among a plurality of policy rings within the object storage environment based on semantics of the one or more policies; and
    wherein a virtual namespace maps each object to at least one of the policy rings based on the one or more policies assigned to the object;
    wherein the virtual namespace is scalable with a number of the plurality of objects stored within the object storage environment;
    wherein the locating uses one or more probabilistic data structures; and wherein the probabilistic data structures provide object-level granularity with respect to assigning policies to the plurality of objects stored within the storage environment.

19. The system of claim 18, comprising logic configured to cause a semantic policy manager to:

use a semantic policy manager to prioritize one or more probabilistic data structures based on semantics of the one or more policies of the object storage environment, and define a scan order for locating the one or more of the objects using the one or more probabilistic data structures, the scan order being based on a priority of each probabilistic data structure;

determine availability characteristics and performance characteristics of a plurality of physical storage devices within the object storage environment upon which the plurality of objects are stored;

determine a plurality of differentials between the availability characteristics and the performance characteristics for each pair of the plurality of physical storage devices;

define a plurality of Bloom filters having different false positive rates based on the plurality of differentials, each Bloom filter corresponding to at least one of the policies;

define a size of each of the Bloom filters based on a policy for which the Bloom Filter is used within the object storage environment;

optimize a false positive rate for each of the Bloom filters using the semantic policy manager, each of the Bloom filters being optimized to have a different false positive rate; and wherein the scan order is further defined based on the different false positive rates.

\* \* \* \* \*